Patented July 11, 1950

2,514,362

UNITED STATES PATENT OFFICE 2,514,362

ARYLALKYLOLAMINES AS STABILIZERS FOR EMULSION POLYMER LATICES

Fred W. Banes, Westfield, and Miller W. Swaney, Cranford, N. J., assignors to Standard Oil Development Company, a corporation of Delaware No Drawing. Application October 31, 1945, Serial No. 625,964

12 Claims. (Cl. 260—45.9)

This invention pertains to improvements in synthetic rubber latex dispersions such as are obtained by polymerization of conjugated diolefins or mixtures of conjugated diolefins with other copolymerizable materials and particularly to short stopping the emulsion polymerization reaction and stabilizing the resultant latices against degradation during the stripping and/or storage of said latices.

In the so-called Buna rubber manufacture, or emulsion polymerization, conjugated diolefins with or without other comonomers such as styrene, acrylonitrile, methyl vinyl ketone and the like which are copolymerizable with conjugated diolefins in aqueous emulsion are emulsified in an aqueous medium, the necessary catalysts, polymerization modifiers, etc. added and the mixture heated with rapid agitation under pressure in suitable reactors to effect polymerization to the desired degree. The rubbery polymer is obtained in the form of a latex which may be used as such, concentrated as by creaming or subjected to coagulation in order to recover the polymer in solid or dry form.

In actual practice it is found that rubber of optimum quality is obtained if the polymerization is not allowed to exceed 70 to 80% conversion of the monomers. Above this range the rubber loses its ease of processing, becomes insoluble in its raw state and yields vulcanizates of inferior properties. In order to avoid the effects of the monomers themselves or low polymers such as dimers and trimers on the final polymer product and also for reasons of economy, it is necessary to remove unreacted monomers from the latex. This is usually done by stripping the latex under reduced pressure with or without the aid of heat and/or a stripping agent such as steam or inert gas. Inasmuch as the stripping conditions are usually as severe as or perhaps more severe than the actual polymerization conditions it is necessary to "short-stop," the system so as to prevent further polymerization of the monomers and to prevent inter-polymer reaction, i. e., cross-linking of polymer chains to produce insolubility and a general deterioration of rubber quality.

While it is customary in the rubber industry to stabilize gum rubber by milling anti-oxidants or age-resisters, such as, phenyl-beta-naphthylamine into it, this type of material will not serve as a latex short-stop because of its water-insolubility and general lack of activity under the conditions existent in emulsion polymer latices. It is therefore necessary to protect the latex rubber from deterioration during stripping, handling and storage, by the use of other materials. Substances which have been employed in the past for this purpose have generally been of the reducing agent type which possess at least some solubility in water. Examples of this class of short-stops are hydroquinone, hydroxylamine, sodium sulfide, sodium sulfite and sodium hyposulfite ($Na_2S_2O_4$). However, most of these compounds possess marked disadvantages of one type or another. For example, hydroquinone is quite effective as a short-stop but it discolors the latex and the recovered gum rubber very badly. Sodium sulfide, on the other hand, does not discolor the latex or the gum rubber but does give rise to traces of hydrogen sulfide which are stripped out with the unreacted monomers thereby poisoning them for subsequent polymerization.

It is the object of this invention to provide a new class of materials as short-stops for emulsion polymerization reaction systems.

It is also the object of this invention to provide short-stops for emulsion polymerization systems which do not appreciably discolor the polymer latices or the polymer itself.

These and other objects will appear more clearly from the detailed specification and claims which follow.

We have discovered that N-aryl-substituted-beta - alkylolamines are exceedingly effective short-stops for emulsion polymer latices. These materials are particularly suitable for this purpose because they are free from undesirable effects upon the latices and they are highly effective in extremely low concentrations.

The class of materials which we may use corresponds to the following structural formula:

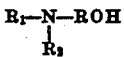

wherein R stands for an alkylene group of 1 to 4 carbon atoms, $R_1$ stands for a member of a group consisting of hydrogen, alkyl and alkylol of not more than 4 carbon atoms, and $R_2$ stands for a member of the group consisting of phenyl, naphthyl and alkyl substituted phenyl containing 1 to 5 carbon atoms in the alkyl radical. Typical of this class of materials is phenyl ethanolamine, $C_6H_5$—NH—$CH_2CH_2OH$; a liquid of some water solubility, para-amylphenyl-ethanolamine,

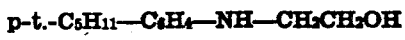

N-phenyl-N-ethyl-ethanolamine

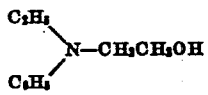

N-naphthyl-ethanolamine, phenyl diethanolamine, N-phenyl-N-butyl-ethanolamine and N-phenyl propanolamine.

The discovery of this new class of short-stops is all the more surprising in view of the fact that the alkyl- or the alkylol substituted alkylolamines are not effective as emulsion polymer latex short-stops.

The N-phenyl substituted alkylolamines of the present invention are applicable as short-stops for synthetic rubber latices which are prepared, as is well known, by the polymerization in aqueous emulsion, of conjugated diolefins such as butadiene-1,3, isoprene, piperylene, dimethylbutadiene, methyl pentadiene and the like taken singly or in combination and in admixture with ethylenically unsaturated polymerizable compounds such as styrene, alpha methyl styrene, para methyl styrene, alpha methyl para methyl styrene, halogenated styrenes such as chloro- or bromo-styrene, acrylonitrile, methacrylonitrile, acrylic- and methacrylic acid esters such as methyl acrylate and methyl methylacrylate, fumaric acid esters such as ethyl fumarate and unsaturated ketones such as methyl vinyl ketones and methyl isopropenyl ketone and also to resin latices prepared by polymerizing monoolefinic materials or mixtures containing a preponderating amount of a monoolefinic material such as styrene, methyl methacrylate, methyl isopropenyl ketone and the like in aqueous emulsion. It is also applicable to these latices before, during or after creaming as described in application Serial No. 556,659, filed September 30, 1944, now U. S. Patent 2,444,801, by E. Arundale. These latices will be referred to hereinafter as synthetic latices or synthetic rubber latices and are not to be confused with any artificial latices prepared by dispersing solid polymerization whether of natural or artificial origin in water.

The synthetic latices which are stabilized in accordance with this invention are prepared by emulsifying the monomer or mixture of monomers in from about an equal to about a twofold quantity of water using, as the emulsifier, water-soluble soaps such as alkali metal or ammonium salts of oleic, stearic or palmitic acid or mixtures of acids such as are obtained by selective hydrogenation of the mixture of fatty acids obtained from tallow. Other emulsifying agents which may be used include such synthetic surface active agents as salts of alkylated benzene- and naphthalene sulfonic acids, fatty alcohol sulfates, salts of aliphatic and olefinic sulfonic acids and also acid addition salts of high molecular weight alkyl amines. The amount of emulsifier used is ordinarily about 0.5 to about 5 weight per cent based on the reactants. A polymerization catalyst such as benzoyl peroxide, hydrogen peroxide and alkali metal or ammonium perborates or persulfates or the like is provided in the reaction mixture in amounts of about 0.05 to about 0.6 weight per cent based on the reactants. It is ordinarily preferred to provide a suitable polymerization modifier or promoter such as dialkyl xanthogen disulfides or aliphatic mercaptans containing at least six carbon atoms in an aliphatic linkage such as hexyl, octyl, decyl, dodecyl, Lorol or benzyl mercaptan in the reaction mixture in amounts of between about 0.2 to about 1.0 weight per cent based upon the reactants present. The reaction mixture is maintained at the desired temperature of between about 15° C. and about 65° C. for a length of time sufficient to convert a major proportion, generally about 75% of the monomers to a solid, high molecular weight polymerizate of the desired properties. Ordinarily about 12 to about 18 hours are required to reach this conversion. The proportions of materials used, temperatures, times of reaction, etc. are well known or understood by the art and form no part of the present invention.

When the desired conversion level is reached, a polymer stabilizer or short-stop of the type described above is added to the latex. The amount of stabilizer added is ordinarily about 0.1% to about 2.0% based upon the polymer although larger amounts such as up to about 6-7% may be used. The latex may then be stripped of unreacted monomers by subjecting it to steam-distillation, preferably under reduced pressure whereupon the latex may be stored as such or subjected to creaming or coagulation.

The particular advantages of the N-phenyl substituted alkylolamines as short-stops for synthetic latices are illustrated by the following examples.

EXAMPLE 1

A number of identical emulsion polymerizations of the butadiene styrene type were conducted in agitated, pressure bottle reactors and after 7 hours' polymerization at 50° C., different quantities of different agents were introduced into the pressure bottles by means of a hypodermic needle technique. Samples of latex were also obtained for determining polymerization conversion at that point. Thereafter the reactor bottles containing the added agents were further agitated for various periods (18 to 48 hours) and the final polymerization conversions determined. The change or increase in conversion during this second period was taken as a measure of the effectiveness of the added material as a short-stop, i. e., the smaller the increase in conversion the better the short-stop. The results obtained are summarized in Table I below. It is apparent from the data that phenyl ethanolamine (Test 1) is outstanding as a reaction short-stop while the other phenyl substituted ethanolamine (Tests 2-7 inclusive) are of definite but intermediate potency. The latices short-stopped with these materials were of good color and that containing phenyl ethanolamine was of very good quality despite the drastic aftertreatment.

Table I

| Short-Stop Added | Amt. Added Wt. Per Cent on Monomers and Polymers | Per Cent Conversion at Short-Stop Injection | Additional Hours Heating at 50° C. | Final Per Cent Conversion | Increase Per Cent Conversion |
|---|---|---|---|---|---|
| ⬡—NHCH₂CH₂OH | 0.05 | 47.5 | 18 | 47.7 | 0.2 |
| t-amyl⬡NHCH₂CH₂OH | 0.05 | 50.5 | 18 | 86.5 | 36 |
| Do. | 0.10 | 44.5 | 18 | 74.2 | 29.7 |
| Do. | 0.20 | 46.5 | 18 | 62.7 | 16.5 |
| ⬡—N(C₂H₅)—CH₂CH₂OH | 0.05 | 51.2 | 18 | 82.0 | 30.8 |
| Do. | 0.10 | 45.4 | 18 | 58.3 | 12.9 |
| Do. | 0.20 | 46.5 | 18 | 52.6 | 6.1 |
| NH₂—CH₂CH₂OH | 0.05 | 51.3 | 18 | 98.8 | 47.5 |
| C₄H₉—NH—CH₂CH₂OH | 0.05 | 45.8 | 18 | 99.2 | 53.4 |
| (C₂H₅)₂N—CH₂CH₂OH | 0.05 | 50.2 | 48 | 99.4 | 49.2 |
| N(CH₂CH₂OH)₃ | 0.05 | 50.2 | 18 | 98.8 | 48.6 |
| morpholine-N—CH₂CH₂OH (CH₂—CH₂/O\CH₂—CH₂ ring) | 0.05 | 54.2 | 48 | 98.7 | 44.5 |
| H₃C—C(NH₂)(CH₃)—CH₂OH | 0.05 | 48.3 | 18 | 99.4 | 51.0 |

EXAMPLE 2

In order further to study the effect of short-stops on the quality of the latex, three identical butadiene-styrene (Buna-S) emulsion polymerizations were carried out simultaneously to about 80% conversion whereupon phenylenthanolamine and hydroquinone were added as short-stops (in amounts of 0.05 wt. percent based on monomers and polymers) to two of the reaction mixtures and nothing to the third which serves as a control for comparison. Samples were taken and the degree of polymerization determined. The three reactors were heated at 50° C. for an additional 12 hours. The final conversion and the amount of "gel" or benzene insoluble fraction in the final polymers were determined. The data tabulated below illustrate the efficacy of phenylethanolamine in preserving the rubber quality and yielding latex and rubber of good color.

a fact which in itself is most surprising since somewhat larger amounts of hydroquinone, for example, are necessary for adequate short-stopping of these latices.

| Percent Phenyl-ethanolamine Added | Percent Conv. at S. S. Addition | Additional Heating at 50° C. | Increase in Conversion |
|---|---|---|---|
| | | Hours | |
| 0.3 | 45.2 | 18 | 0.6 |
| 0.2 | 44.5 | 18 | 0.2 |
| 0.1 | 46.2 | 18 | 0.0 |
| 0.05 | 47.2 | 18 | 0.2 |
| 0.025 | 51.5 | 18 | 0.0 |
| 0.0125 | 49.8 | 18 | 6.7 |

| Short-Stop Added | Percent Conversion at S. S. Addition | Additional Hours Heating at 50° C. | Final Conv. Percent | Conversion Increase | Percent Gel Final Rubber | Color |
|---|---|---|---|---|---|---|
| None | 77.6 | 12 | 97.9 | 20.3 | 58.8 | Good. |
| Phenylethanolamine | 81.2 | 12 | 81.2 | 0 | 0 | Do. |
| Hydroquinone | 78.2 | 12 | 78.2 | 0 | 1.4 | Discolored. |

EXAMPLE 3

In order to determine the minimum concentration of phenylethanolamine required for short-stopping a butadiene-styrene type latex, successively lower concentrations of this agent were added to identical bottles containing active latex by the hypodermic needle injection technique. The data below indicate that as little as 0.01–0.02 wt. percent based upon the monomers and polymers is sufficient for short-stopping of the latex,

EXAMPLE 4

A synthetic latex was prepared according to the following recipe:

| | Parts by weight |
|---|---|
| Butadiene | 75 |
| Acrylonitrile | 25 |
| Water | 200 |
| Sodium soap | 5 |
| Potassium persulfate | 0.3 |
| Dodecyl mercaptan | 0.5 |

The polymerization reactions were carried to the desired conversion level (about 70%) whereupon the latices were short-stopped with different reagents, stripped of unreacted monomers whereupon the polymer was coagulated, washed and dried in an air oven for 8 hours at 200° F. The percent of gel present and the Williams Plasticity-Recovery values were determined. The data tabulated below indicate that in addition to being a short-stop for the latex, phenylethanolamine also affords substantial protection to the polymer in the dry state.

| Agents Added to Butadiene-Acrylonitrile Copolymer | Per Cent Gel in Aged Polymer | Williams Plasticity-Recovery [1] | Color |
|---|---|---|---|
| 0.2% Phenylethanolamine. | 0 | 92-2 | Good. |
| 0.2% Hydroquinone+ 2% Phenyl-beta naphthylamine. | 0 | 92-0 | Discolored. |
| 0.2% Triethylenetetramine. | 53 | 208-22 | O. K. |

[1] The lower the Williams Plasticity value the more plastic and better the rubber.

EXAMPLE 5

In another series of experiments, phenyl ethanolamine was compared with sodium hyposulfite, $Na_2S_2O_4$, as a short-stopping agent for a butadiene-acrylonitrile type latex. The data are as follows:

| Agent Added to Latex | Per Cent Gel in Dry Rubber After Aging (8 hrs./200° F.) | Mooney Viscosity [1] of Aged Rubber (4 Min.) |
|---|---|---|
| 0.2% Phenylethanolamine | 0 | 71 |
| 0.2% $Na_2S_2O_4$ | 45 | 122 |

[1] The lower the Mooney value, the better the plasticity of the rubber.

EXAMPLE 6

In order to test the efficacy of phenylethanolamine as a short-stop in butadiene-acrylonitrile polymerization systems at lower conversions two reactors were charged with the polymerization recipe as described in Example 4 whereupon phenylethanolamine and hydroquinone were introduced into the reactors at a somewhat lower conversion level by means of the hypodermic needle injection technique. The results obtained are tabulated below:

| Agent added to the Butadiene-Acrylonitrile latex | Per Cent Conversion at S. S. Addition | Hours Additional Heating at 30° C. | Increase in Conversion | Color of Latex |
|---|---|---|---|---|
| 0.05% Phenylethanolamine | 35.2 | 18 | *Per Cent* <1 | Good. |
| 0.05% Hydroquinone | 33.8 | 18 | 7 | Discolored. |

EXAMPLE 7

In order to determine if the use of phenylethanolamine as a short-stop impaired the properties of the vulcanized rubbers, various quantities were added to a butadiene-acrylonitrile latex prepared in accordance with the polymerization recipe of Example 4. The latices were stripped and the polymer recovered by coagulation and drying. The dry polymers obtained were compounded according to the following recipe:

| | Parts by weight |
|---|---|
| Polymer | 100 |
| Zinc oxide | 5 |
| Stearic acid | 1.5 |
| Sulfur | 1.5 |
| Benzothiazyl disulfide | 1.25 |
| Diphenylguanidine | 1.25 |
| Carbon black | 45 |
| Plasticizer | 9.5 |

The tensile strength, modulus and per cent elongation of the vulcanizates cured at 287° F. for 30 and 60 minutes were determined. The results obtained were as follows:

| Short-Stop Added | 30' Cure/287° F. | | | 60' Cure/287° F. | | |
|---|---|---|---|---|---|---|
| | Tensile | 300% Modulus | Ult. Elong. | Tensile | 300% Modulus | Ult. Elong. |
| | *P.s.i.* | *P.s.i.* | *Per Cent* | *P.s.i.* | *P.s.i.* | *Per Cent* |
| 0.22% Hydroquinone | 2,730 | 360 | 775 | 2,930 | 580 | 655 |
| 0.25% Phenylethanolamine | 2,940 | 380 | 840 | 3,450 | 570 | 745 |
| 0.54% Phenylethanolamine | 3,040 | 325 | 820 | 2,955 | 655 | 685 |
| 0.75% Phenylethanolamine | 3,320 | 360 | 710 | 3,530 | 665 | 665 |

The foregoing description contains a limited number of embodiments of the present invention. It will be understood, however, that the foregoing examples are merely illustrative of the present invention and that the latter is not limited to the specific conditions described since numerous variations are possible without departing from the scope of our invention as defined in the following claims.

What we claim and desire to secure by Letters Patent is:

1. The method of stabilizing against further polymerization synthetic rubber latices prepared by polymerizing in aqueous emulsion a conjugated diolefin of 4 to 6 carbon atoms which comprises adding thereto 0.05 to 2 weight percent based on the polymer of N-phenyl substituted alkylolamines having 2 to 3 carbon atoms per alkyl group.

2. The method of stabilizing against further polymerization synthetic rubber latices prepared by polymerizing in aqueous emulsion a conjugated diolefin of 4 to 6 carbon atoms which comprises adding thereto 0.05 to 7 weight percent based on the polymer of a compound of the general formula

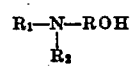

wherein ROH stands for an alkylol group of 2 to 3 carbon atoms, $R_1$ stands for a member of the group consisting of hydrogen, alkyl of 2 to 4 carbon atoms and alkylol of 2 to 3 carbon atoms, and $R_2$ stands for a member of the group consisting of phenyl, naphthyl and amyl substituted phenyl.

3. The method of stabilizing against further polymerization synthetic rubber latices prepared by polymerizing in aqueous emulsion a mixture of a conjugated diolefin of 4 to 6 carbon atoms and an ethylenically unsaturated comonomer capable of copolymerizing with said diolefin which comprises adding thereto 0.2 to 6 weight percent based on the polymer of a compound of the general formula

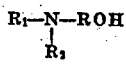

wherein ROH stands for an alkylol group of 2 to 3 carbon atoms, $R_1$ stands for a member of the group consisting of hydrogen, alkyl of 2 to 4 carbon atoms and alkylol of 2 to 3 carbon atoms, and $R_2$ stands for a member of the group consisting of phenyl, naphthyl and amyl substituted phenyl.

4. The method according to claim 3 wherein the ethylenically unsaturated comonomer is stryene.

5. The method of stabilizing against further polymerization synthetic rubber latices prepared by polmerizing in aqueous emulsion a mixture of a major proportion of a conjugated diolefin of 4 to 6 carbon atoms and a minor proportion of a nitrile of a low molecular weight unsaturated acid which comprises adding thereto 0.05 to 6 percent based on the weight of polymer of a N-phenyl substituted alkylolamine having 2 to 3 carbon atoms in the alkylol group.

6. The method of stabilizing against further polymerization synthetic rubber latices prepared by polymerizing in aqueous emulsion a conjugated diolefin of 4 to 6 carbon atoms which comprises adding thereto N-phenyl-beta-ethanolamine in an amount equal to 0.01 to 7 weight percent based on the polymer.

7. The method of stabilizing against further polymerization synthetic rubber latices prepared by polymerizing in aqueous emulsion a major proportion of butadiene-1,3 and a minor proportion of stryene which comprises adding thereto in an amount N-phenyl-beta-ethanolamine equal to 0.01 to 2 weight percent based on the polymer.

8. The method of stabilizing against further polymerization synthetic rubber latices prepared by polymerizing in an aqueous emulsion a major proportion of butadiene-1,3 and a minor proportion of acrylonitrile which comprises adding thereto N-phenyl-beta-ethanolamine in an amount equal to 0.01 to 6 weight percent based on the polymer.

9. The method of stabilizing against further polymerization synthetic rubber latices prepared by polymerizing in aqueous emulsion a major proportion of butadiene-1,3 and a minor proportion of methacrylonitrile which comprises adding thereto N-phenyl-beta-ethanolamine in an amount equal to 0.05 to 6 weight percent based on the polymer.

10. A composition comprising a synthetic rubber latex of polymerized mixture of a major proportion of a conjugated diolefin of 4 to 6 carbon atoms and a minor proportion of an ethylenically unsaturated comonomer capable of copolymerizing with said diolefin; and 0.05 to 6 weight percent based on the polymer of an N-phenyl substituted alkylolamine having 2 to 3 carbon atoms in the alkylol group.

11. A composition of a synthetic rubber latex of a polymerized conjugated diolefin of 4 to 6 carbon atoms and 0.1 to 6 weight percent based on the polymer of a compound having the general formula

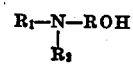

wherein ROH stands for an alkylol group of 2 to 3 carbon atoms, $R_1$ stands for a member of the group consisting of hydrogen, alkyl of 2 to 4 carbon atoms and alkylol of 2 to 3 carbon atoms, and $R_2$ stands for a member of the group consisting of phenyl, naphthyl and amyl substituted phenyl.

12. A composition comprising a synthetic rubber latex of a polymerized mixture of a conjugated diolefin of 4 to 6 carbon atoms and a minor proportion of an ethylenically unsaturated comonomer capable of copolymerizing with said diolefin; and 0.01 to 2 weight percent based on the polymer of N-phenyl-beta-ethanolamine.

FRED W. BANES.
MILLER W. SWANEY.

REFERENCES CITED

The following references are of record in the file of this patent:

UNITED STATES PATENTS

| Number | Name | Date |
|---|---|---|
| 2,394,010 | Quarles | Feb. 5, 1946 |
| 2,444,801 | Arundale | July 6, 1948 |

OTHER REFERENCES

"Du Pont Rubber Chemicals," Report No. 43—1, page 121, (Feb. 1943).